Jan. 22, 1963  W. LEHMANN  3,075,117
METHOD OF IMPROVING ELECTROLUMINESCENT PHOSPHOR
AND ELECTROLUMINESCENT LAMP
Filed June 20, 1960

INVENTOR.
WILLI LEHMANN.
BY
W. D. Palmer
ATTORNEY.

United States Patent Office

3,075,117
Patented Jan. 22, 1963

3,075,117
METHOD OF IMPROVING ELECTROLUMINESCENT PHOSPHOR AND ELECTROLUMINESCENT LAMP
Willi Lehmann, Livingston, N.J., assignor to Westinghouse Electric Corporation, East Pittsburgh, Pa., a corporation of Pennsylvania
Filed June 20, 1960, Ser. No. 37,501
10 Claims. (Cl. 313—108)

This invention relates to a method for improving electroluminescent phosphor and, more particularly, to a method for improving the efficiency of electroluminescent phosphor and to an electroluminescent lamp which incorporates such improved phosphor.

The phenomenon of electroluminescence was first disclosed by G. Destriau, one of his earlier publications appearing in London, Edinburgh and Dublin Philosophical Magazine, series 7, volume 38, No. 285, pages 700–737 (October 1947). Since this early publication, electroluminescent devices have been marketed commercially. The efficiency of electroluminescent devices is not as good as desired, sometimes resulting in excessive heating during operation. It has been disclosed to improve the efficiency of electroluminescent phosphor by separating or by otherwise obtaining relatively small particle size phosphor material. It has also been disclosed to improve the efficiency of electroluminescent phosphor by mixing a drying agent with the prepared phosphor. It is desirable to increase the efficiency of electroluminescent devices still more.

It is the general object of this invention to provide a method for making an electroluminescent phosphor in order to improve its efficiency.

It is another object to provide method details for making copper-activated zinc sulfide electroluminescent phosphor having improved efficiency.

It is a further object to provide an electroluminescent lamp of improved efficiency, which lamp incorporates electroluminescent phosphor which has been specially prepared.

The aforesaid objects of the invention, and other objects which will become apparent as the description proceeds, are achieved by controlling very carefully the relative proportions of activator and so-called coactivator materials with respect to the zinc sulfide in the phosphor raw mix. The prepared raw mix is fired to form an electroluminescent phophor, the fired phosphor is then crushed to finely divided status, and thereafter washed to remove excessive cuprous sulfide.

For a better understanding of the invention, reference should be had to the accompanying drawings wherein.

Figure 1:
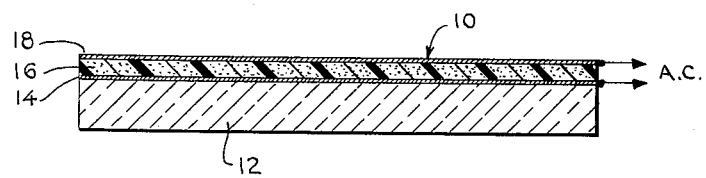
FIG. 1 is a sectional-elevational view of an electroluminescent lamp incorporating phosphor prepared in accordance with this invention.

With specific reference to the form of the invention illustrated in the drawings, in FIG. 1 is shown an electroluminescent lamp 10 which generally comprises a glass foundation 12 having coated thereon a first electrode which is formed of light-transmitting, electrically-conducting tin oxide. Coated over the electrode 14 is a layer 16 comprising electroluminescent phosphor which has been initially processed in accordance with the present invention. Over the layer 16 is a second electrode 18 which is formed of vacuum-metallized aluminum or light-transmitting copper iodide, for example. An alternating potential is adapted to be applied between the electrodes 14 and 18 in order to energize the electroluminescent phosphor to light emission.

The tin oxide electrode 14 can be formed of other suitable light-transmitting, electrically-conducting materials such as indium or titanium oxides or copper iodide. In this specific example, the phosphor, which has been initially processed as explained hereinafter, is mixed with equal parts by weight of a light-transmitting dielectric such as polyvinylchloride acetate and the thickness of the layer 16 is approximately 2 mils. The thickness of the layer 16 is not critical and can be varied considerably. If desired, a separate layer of dielectric can be included between the lamp electrodes 14 and 18 or the dielectric can be dispensed with entirely and powdered phosphor compacted between the two electrodes of the lamp without any mixed dielectric. Either or both of the electrodes 14 or 18 can be replaced by a mesh of wires or the electrodes for the lamp 10 can be formed as an interlacing mesh of wires with phosphor therebetween.

Figure 2:
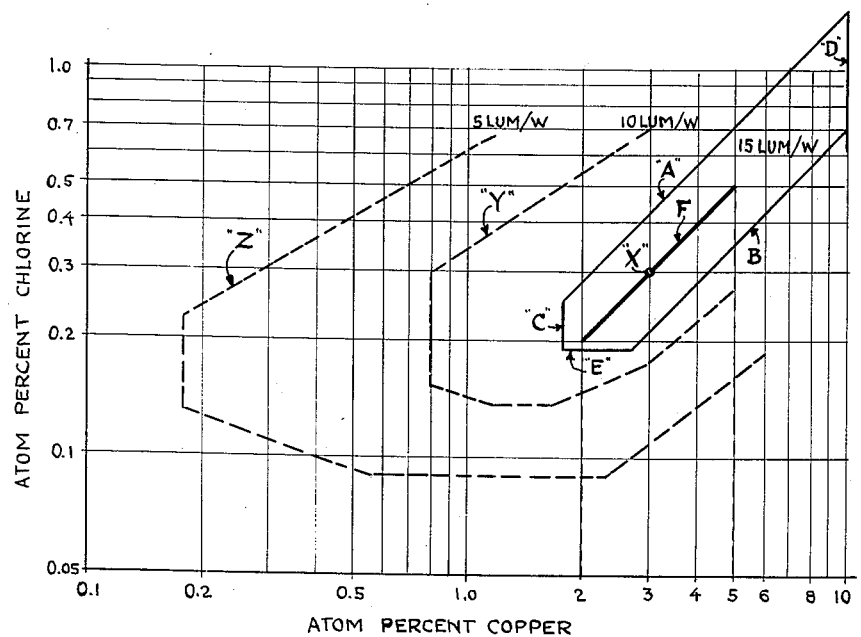
FIG. 2 is a graph of atom percent chlorine versus atom percent copper in the phosphor raw mix, with prepared phosphor operating efficiency controus shown thereon.

In accordance with the present invention, the phosphor is initially prepared by including in the phosphor raw mix, zinc sulfide and specific relative percentages of copper in compound form and chlorine, bromine, or mixtures thereof, in compound form. The zinc sulfide constituent of the raw mix provides the phosphor matrix. To the best of present knowledge, the copper provides the primary activator while the specified halogen provides the phosphor coactivator. Apparently the coactivator is required in order to cause the phosphor activator to be assimilated into the zinc sulfide matrix, to render the material electroluminescent. By way of further detail, finely divided zinc sulfide, copper in compound form and the specified halogen in compound form are thoroughly mixed in such proportions that a plot of atom percent of total halogen per molecule of zinc sulfide in the unfired mix versus atom percent of copper per molecule of zinc sulfide in the unfired mix falls within the area enclosed by the lines A through E, as shown in FIG. 2. If the phosphor raw mix falls within the area enclosed by these lines, a device incorporating the prepared phosphor will have an electroluminescent efficiency of at least 15 lumens per watt, as these lines approximate the 15 lumen per watt efficiency contour. Each of the lines A through E in FIG. 2 can be represented by formula as follows: (line A)—atom percent of halogen=0.14 atom percent copper; (line B)—atom percent of halogen=0.07 atom percent copper; (line C)—atom percent copper=1.8; (line D)—atom percent copper=10; (line E)—atom percent halogen=0.19.

As a specific example, 9.75 grams of finely divided zinc sulfide are wet mixed with 0.60 gram of copper acetate and 0.016 gram of ammonium chloride. This represents three atom percent of copper and 0.3 atom percent of chlorine, as represented by the point designed "X" on FIG. 2. There is also added 0.3 gram of elemental sulphur to the raw mix. This amount of added sulphur can be varied considerably. The wet raw mix is dried and the dry powder placed into a covered silica tube having a capacity of about 12 cc. The raw mix is then fired in an inert atmosphere such as nitrogen at a temperature of about 950° C. for about one hour. This firing renders the phosphor electroluminescent, although it has a dark grey appearance and is in the form of a friable cake. The dark, fired phosphor cake is crushed to finely divided status, such as with a mortar and pestle. It is then washed in a solution of sodium cyanide, which desirably is made alkaline with sodium hydroxide in order to prevent any evolution of hydrogen cyanide gas. As a specific example, the phosphor is washed for about two hours in a 10% by weight aqueous solution of sodium cyanide which also contains 5% by weight of sodium hydroxide. Thereafter the washed phosphor desirably is rinsed several times with distilled water, separated from the water rinse, and to facilitate drying desirably is heated to about 120° C. The foregoing washing removes excess cuprous sulfide from the surface of the phosphor and the body color of the washed, finely divided phosphor material is generally white.

As noted, in order to obtain a high degree of efficiency for an electroluminescent device, such as fifteen lumens per watt, the relative proportions of coactivator and activator should not fall outside the area enclosed by the lines A through E as shown in FIG. 2. As an example, the dotted line designated "Y" in FIG. 2 approximates the ten-lumen-per-watt efficiency contour for an electroluminescent device incorporating phosphor which is otherwise similar, but with the indicated relative proportions of chlorine coactivator and copper activator in the raw mix. Similarly, the dotted line designated "Z" in FIG. 2 approximates the five-lumen-per-watt efficiency contour.

For best results, it is preferred that the relative proportions of the specified halogen and copper fall on approximately the line designated "F" in FIG. 2, namely, the line described by atom percent halogen=0.10 atom percent copper, with copper being from 2 to 5 atom percent. It has been found that if the copper is present in greater than 10 atom percent with respect to the molecules of zinc sulfide in the raw mix, the resulting phosphor after firing is quite hard and difficult to reduce to finely-divided status and, in addition, the phosphor brightness is considerably impaired. It is preferred for best overall phosphor performance characteristics, with emphasis on efficiency, to limit the copper content to from 2 to 5 atom percent of the zinc sulfide.

The foregoing specific example for preparing the present phosphor can be modified considerably. As an example, the firing atmosphere inside the firing tube is sulphurizing in nature because of the elemental sulphur which is added to the phosphor raw mix. It has been found that a sulphurizing atmosphere is required in order to produce the most efficient phosphors. A suitable sulphurizing atmosphere can be obtained, however, by firing the phosphor raw mix in a mixture of hydrogen sulfide, hydrogen chloride and nitrogen. The predetermined firing conditions used in preparing the phosphor essentially do not differ from those which have been previously known, such as described in U.S. Patent No. 2,874,128, dated February 17, 1959. As an example, the firing temperature can be varied from 850° C. to 1000° C. and the firing time can be varied considerably, with the higher the firing temperature, the shorter the firing time. A double firing procedure can be used if desired. The washing solution which is used to remove excess cuprous sulfide is preferably the aqueous sodium cyanide solution as described, although other solvents which function in a similar manner can be substituted for this preferred washing solution. Examples of other suitable solutions which are good solvents for cuprous sulfide, but which are not good solvents for zinc sulfide, are similar solutions of potassium or ammonium cyanide, or sodium or potassium thiosulphate or thiocyanate, or any mixtures of the foregoing. In addition, the concentration of the washing solution is not critical and can be varied.

In the foregoing preferred specific example, copper is added in compound form as the acetate. Chlorine is added in compound form as ammonium chloride. The copper can be added in the form of other compounds, such as copper nitrate, sulfite or sulfate, for example. The chlorine can be added in other forms such as zinc chloride or cadmium chloride for example. In the case of the latter addition, the cadmium will not volatilize on firing, but the amount of cadmium present is too small to affect the phosphor. Other copper- and halogen-containing compounds can be substituted for those indicated, excluding those compounds which include the well-known phosphor poisoning metals, namely, iron, cobalt, nickel or chromium, an example being copper chromate. In addition, some zinc oxide can be tolerated in the phosphor raw mix. While the foregoing specific examples have been carried through with respect to the use of a chlorine coactivator in the phosphor raw mix, equivalent bromine-containing compounds, such as ammonium bromide, can be substituted in equivalent amount for the listed chlorine-containing compounds and the resulting phosphor performance characteristics will be substantially the same. Also, the chlorine- and bromine-containing compounds can be mixed in any proportions.

In testing the phosphor samples in order to obtain the data from which the lamp performance characteristics as shown in FIG. 2 were plotted, varying phosphor raw mix formulations were prepared in the manner as specified hereinbefore and incorporated into an electroluminescent lamp generally as described in FIG. 1, except that a castor oil dielectric was used for facility of test. The excitation used was varied from 100 to 600 volts, 400 cycles. The efficiency of such an electroluminescent lamp can be improved still further by separating coarse particles from the prepared phosphor, as disclosed in copending application S.N. 746,360, filed July 3, 1958, by Lehmann, the inventor herein, and owned by the present assignee. The efficiency of such an electroluminescent lamp can also be improved by incorporating a drying medium with the prepared phosphor, as disclosed in S.N. 861,849, filed December 24, 1959, by Lehmann, the inventor herein, and owned by the present assignee. Both of these latter methods for improving the efficiency of electroluminescent phosphor are supplementary to the present method.

It should be noted that the copper-activated zinc sulfide electroluminescent phosphors as described hereinbefore are the most efficient ever reported, without taking additional steps to segregate phosphor particles by size or by adding drying agents thereto. The maximum brightness obtainable is somewhat decreased, however, from that maximum brightness obtainable with electroluminescent phosphors which incorporate a somewhat smaller amount of copper with respect to the relative proportion of chlorine present in the raw mix. There are some applications, however, where efficiency is of more importance than maximum brightness.

It will be recognized that the objects of the invention have been achieved by providing a method for improving the efficiency of copper-activated zinc sulfide electroluminescent phosphor and there has also been provided an electroluminescent lamp having improved efficiency, which lamp incorporates electroluminescent phosphor which has been specially prepared.

While one best example of the invention has been illustrated and described in detail, it is to be particularly understood that the invention is not limited thereto or thereby.

I claim:
1. The method of processing a copper-activated zinc sulfide electroluminescent phosphor to obtain a high degree of electroluminescent efficiency, which method comprises: mixing zinc sulfide with copper in compound form and at least one halogen in compound form selected from the group consisting of chlorine and bromine in compound form, and excluding compounds containing at least one element of the group consisting of iron, cobalt, nickel and chromium, with the mixed ingredients having such relative proportions that a plot of atom percent of total halogens in compound form per molecule of zinc sulfide in such mixture vs. atom percent of copper per molecule of zinc sulfide in such mixture falls within the area described and enclosed by the following lines on such plot:

atom percent of total halogens=0.14 atom percent copper,
atom percent of total halogens=0.07 atom percent copper,
atom percent copper=1.8,
atom percent copper=10,
atom percent of total halogens=0.19;

firing the mixture at a predetermined temperature and for a predetermined time in a sulphurizing atmosphere to convert the mixture into an electroluminescent phosphor; reducing the fired phosphor to finely divided status; and washing the finely divided phosphor in a material which is a good solvent for cuprous sulfide but which is not a good solvent for zinc sulfide.

2. The method of making a phosphor as specified in claim 1, wherein the mixed halogen in compound form consists of chlorine.

3. The method of making a phosphor as specified in claim 1, wherein the mixed halogen in compound form consists of bromine.

4. The method of processing a copper-activated zinc sulfide electroluminescent phosphor to obtain a high degree of electroluminescent efficiency, which method comprises: mixing zinc sulfide with copper in compound form and at least one halogen in compound form selected from the group consisting of chlorine and bromine in compound form, and excluding compounds containing at least one element of the group consisting of iron, cobalt, nickel and chromium, with the mixed ingredients having such relative proportions that a plot of atom percent of total halogens in compound form per molecule of zinc sulfide in such mixture vs. atom percent of copper per molecule of zinc sulfide in such mixture falls on about the following line on such plot: atom percent of total halogens=0.10 atom percent copper, with the atom percent of copper from 2 to 5; firing the mixture at a predetermined temperature and for a predetermined time in a sulphurizing atmosphere to convert the mixture into an electroluminescent phosphor; reducing the fired phosphor to finely divided status; and washing the finely divided phosphor in a material which is a good solvent for cuprous sulfide but which is not a good solvent for zinc sulfide.

5. The method of making a phosphor as specified in claim 4, wherein the mixed halogen in compound form consists of chlorine.

6. The method of making a phosphor as specified in claim 4, wherein the mixed halogen in compound form consists of bromine.

7. The method of processing a copper-activated zinc sulfide electroluminescent phosphor to obtain a high degree of electroluminescent efficiency, which method comprises, wet mixing zinc sulfide with three atom percent of copper as copper acetate per molecule of mixed zinc sulfide and 0.3 atom percent of chlorine as ammonium chloride per molecule of mixed zinc sulfide, firing the mixture at a temperature of 950° C. for one hour in an atmosphere consisting of nitrogen and sulphur vapor to convert the mixture into an electroluminescent phosphor, reducing the fired phosphor to finely divided status, and washing the finely divided phosphor in an aqueous and alkaline sodium cyanide solution.

8. A highly efficient electroluminescent cell comprising: spaced electrodes, material between said spaced electrodes comprising copper-activated zinc sulfide electroluminescent phosphor, and said phosphor having been prepared by the method which comprises: mixing zinc sulfide with copper in compound form and at least one halogen in compound form selected from the group consisting of chlorine and bromine in compound form, and excluding compounds containing at least one element of the group consisting of iron, cobalt, nickel and chromium, with the mixed ingredients having such relative proportions that a plot of atom percent of total halogens in compound form per molecule of zinc sulfide in such mixture vs. atom percent of copper per molecule of zinc sulfide in such mixture falls within the area described and enclosed by the following lines on such plot:

atom percent of total halogens=0.14 atom percent copper,
atom percent of total halogens=0.07 atom percent copper
atom percent copper=1.8,
atom percent copper=10,
atom percent of total halogens=0.19;

firing the mixture at a predetermined temperature and for a predetermined time in a sulphurizing atomsphere to convert the mixture into an electroluminescent phosphor; reducing the fired phosphor to finely divided status; and washing the finely divided phosphor in a material which is a good solvent for cuprous sulfide but which is not a good solvent for zinc sulfide.

9. A highly efficient electroluminescent cell comprising: spaced electrodes, material between said spaced electrodes comprising copper-activated zinc sulfide electroluminescent phosphor, and said phosphor having been prepared by the method which comprises: mixing zinc sulfide with copper in compound form and at least one halogen in compound form selected from the group consisting of chlorine and bromine in compound form, and excluding compounds containing at least one element of the group consisting of iron, cobalt, nickel and chromium, with the mixed ingredients having such relative proportions that a plot of atom percent of total halogens in compound form per molecule of zinc sulfide in such mixture vs. atom percent of copper per molecule of zinc sulfide in such mixture falls within the area described and enclosed by the following lines on such plot:

atom percent of total halogens=0.14 atom percent copper,
atom percent of total halogens=0.07 atom percent copper,
atom percent copper=1.8,
atom percent copper=10,
atom percent of total halogens =0.19;

firing the mixture at a temperature of about 950° C. for a period of about one hour in a sulphurizing atmosphere to convert the mixture into an electroluminescent phosphor; reducing the fired phosphor to finely divided status; and washing the finely divided phosphor in a material which is a good solvent for cuprous sulfide but which is not a good solvent for zinc sulfide.

10. A highly efficient electroluminescent cell comprising: spaced electrodes, material between said spaced electrodes comprising copper-activated zinc sulfide electroluminescent phosphor, and said phosphor having been prepared by the method which comprises: mixing zinc sulfide with copper in compound form and at least one halogen in compound form selected from the group consisting of chlorine and bromine in compound form, and excluding compounds containing at least one element of the group consisting of iron, cobalt, nickel and chromium, with the mixed ingredients having such relative proportions that a plot of atom percent of total halogens in compound form per molecule of zinc sulfide in such mixture vs. atom percent of copper per molecule of zinc sulfide in such mixture falls within the area described and enclosed by the following lines on such plot:

atom percent of total halogens=0.14 atom percent copper, atom percent of total halogens =0.07 atom percent copper,
atom percent copper=1.8,
atom percent copper=10,
atom percent of total halogens =0.19;
firing the mixture at a temperature of from 850° C. to 1000° C. in a sulphurizing atmosphere, with the higher the firing temperature the shorter the firing time, to convert the mixture into an electroluminescent phosphor; reducing the fired phosphor to finely divided status; and washing the finely divided phosphor in a material which is a good solvent for cuprous sulfide but which is not a good solvent for zinc sulfide.

References Cited in the file of this patent

UNITED STATES PATENTS

| | | |
|---|---|---|
| 2,874,128 | Wachtel | Feb. 17, 1959 |
| 2,937,150 | Lehmann | May 17, 1960 |
| 2,951,813 | Wachtel | Sept. 6, 1960 |
| 2,972,694 | Thornton | Feb. 21, 1961 |